United States Patent [19]
Jin et al.

[11] Patent Number: 5,964,425
[45] Date of Patent: *Oct. 12, 1999

[54] DECK MECHANISM OF HEADPHONE STEREO

[75] Inventors: Hong Jae Jin, Seoul; Byung Ju Dan, Kyungki-Do, both of Rep. of Korea

[73] Assignee: LG Electronics Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/764,005

[22] Filed: Dec. 12, 1996

[51] Int. Cl.⁶ .......................... G11B 15/32; G11B 5/008
[52] U.S. Cl. ................ 242/354; 242/356; 242/356.5; 242/354.1; 360/96.4
[58] Field of Search ..................... 242/354, 356, 242/356.3, 356.5, 356.7, 354.1; 360/96.3, 96.4

[56] References Cited

U.S. PATENT DOCUMENTS

| | | | |
|---|---|---|---|
| 4,494,712 | 1/1985 | Godwin, Jr. et al. | 242/356.5 |
| 5,346,156 | 9/1994 | Kunze et al. | 242/356 X |
| 5,481,418 | 1/1996 | Maikuma et al. | 242/356 X |

Primary Examiner—John Q. Nguyen

[57] ABSTRACT

A deck mechanism of a headphone stereo which is capable of minimizing a tension working on a belt and of controlling a rotation torque transmitted to a reel in an FF or REW mode by transmitting a driving force of a driving motor by a power transmission gear unit, includes a power transmission gear unit for transmitting a driving force of the driving motor, a mode selector for transmitting the driving force transmitted by the power transmission gear unit according to a selected mode, a reel driver for driving a reel according to the selection of the mode selector, a power transmission idler unit moving according to the play direction of the reel driver, and a capstan driver for driving a capstan through a belt transmission by a selective engagement of the power transmission idler unit.

7 Claims, 6 Drawing Sheets

DECK MECHANISM OF HEADPHONE STEREO

BACKGROUND OF THE INVENTION

1. Field of the Invention

The present invention relates to a headphone stereo, and more particularly, to an improved deck mechanism of a headphone stereo which is capable of minimizing a tension working on a belt and of controlling a rotation torque transmitted to a reel in a fast forward(FF) or a rewind(REW) mode by transmitting a driving force of a motor by a gear assembly.

2. Description of Related Art

FIG. 1 is a schematic view showing a deck mechanism of a headphone stereo according to the conventional art. As shown in this drawing, a driving motor 3 having a motor pulley 2 disposed therein is mounted on a motor axis 1, and on an upper portion of the driving motor 3, an auxiliary pulley 4 is disposed.

A reverse (RVS) capstan 6 having a RVS pulley 5 for tracking a tape is provided at one side of the auxiliary pulley 4. On an identical horizontal line to the RVS capstan 6, a forward (FWD) capstan 8 having an FWD pulley 7 therein is disposed.

A power transmission pulley 10 is mounted at a lower portion of the RVS capstan 6 and a small gear 9 is mounted on an upper surface of the power transmission pulley 10.

The small gear 9 of the power transmission pulley 10 engages with the power transmission gear 11.

A belt 12 is wound around the motor pulley 2, the auxiliary pulley 4, the RVS pulley 5, the FWD pulley 7 and the power transmission pulley 10 to operate with one another.

The operation and problems of the deck mechanism of the headphone stereo according to the conventional art having the above construction will now be described in detail.

First, when the driving motor 3 starts to rotate, the driving force of the driving motor 3 is transmitted to each pulley 2,4,5,7,10 through the belt 12. Here, the transmitted driving force carries out two roles according to the selection of the mode.

One is to operate the capstans 6,8 for tracking a tape, and the other is to operate a reel (not illustrated) for supplying or winding a tape.

However, since a strong tension must be given to the belt 12 in order to wind the belt 12 around pulleys 2,4,5,7,10, power consumption is disadvantageously increased.

Further, when shaking occurs in a predetermined place, the shaking influences the entire system, generating a wow and flutter phenomenon.

When the FF or REW mode is operated, since an excessive torque is applied on the reel even when the tape winding is finished, the tape disadvantageously tends to be damaged.

SUMMARY OF THE INVENTION

Accordingly, it is an object of the present invention to provide an improved deck mechanism of a headphone stereo which is capable of minimizing tension working on a belt and of controlling a rotation torque transmitted to a reel in an FF or REW mode by transmitting a driving force of a motor by a gear assembly.

To achieve the above object, a deck mechanism of a headphone stereo according to an embodiment of the present invention is provided which includes a power transmission gear unit for transmitting a driving force of a driving force, a mode selector for transmitting the driving force transmitted by the power transmission gear unit according to a selected mode, a reel driver for driving a reel according to the selection of the mode selector, a power transmission idler unit moving according to the play direction of the reel driver, and a capstan driver for driving a capstan through a belt transmission by a selective engagement of the power transmission idler unit.

To achieve the above object, a deck mechanism of a headphone stereo according to another embodiment of the present invention is provided which includes a main pulley gear having a main gear unit engaging and cooperating with an axial gear of a driving gear and a main pulley unit surrounded by a belt, a capstan driver to which a rotation force of the main pulley gear is transmitted through the belt, and a power transmission gear transmitting a rotating force of the main pulley gear by a gear transmission in a reel direction.

BRIEF DESCRIPTION OF THE DRAWINGS

The present invention will be more fully understood from the detailed description given hereinbelow and the accompanying drawings, which are given by way of illustration only and are thus not limitative of the present invention, wherein.

DETAILED DESCRIPTION OF THE PREFERRED EMBODIMENTS

Figure 1:
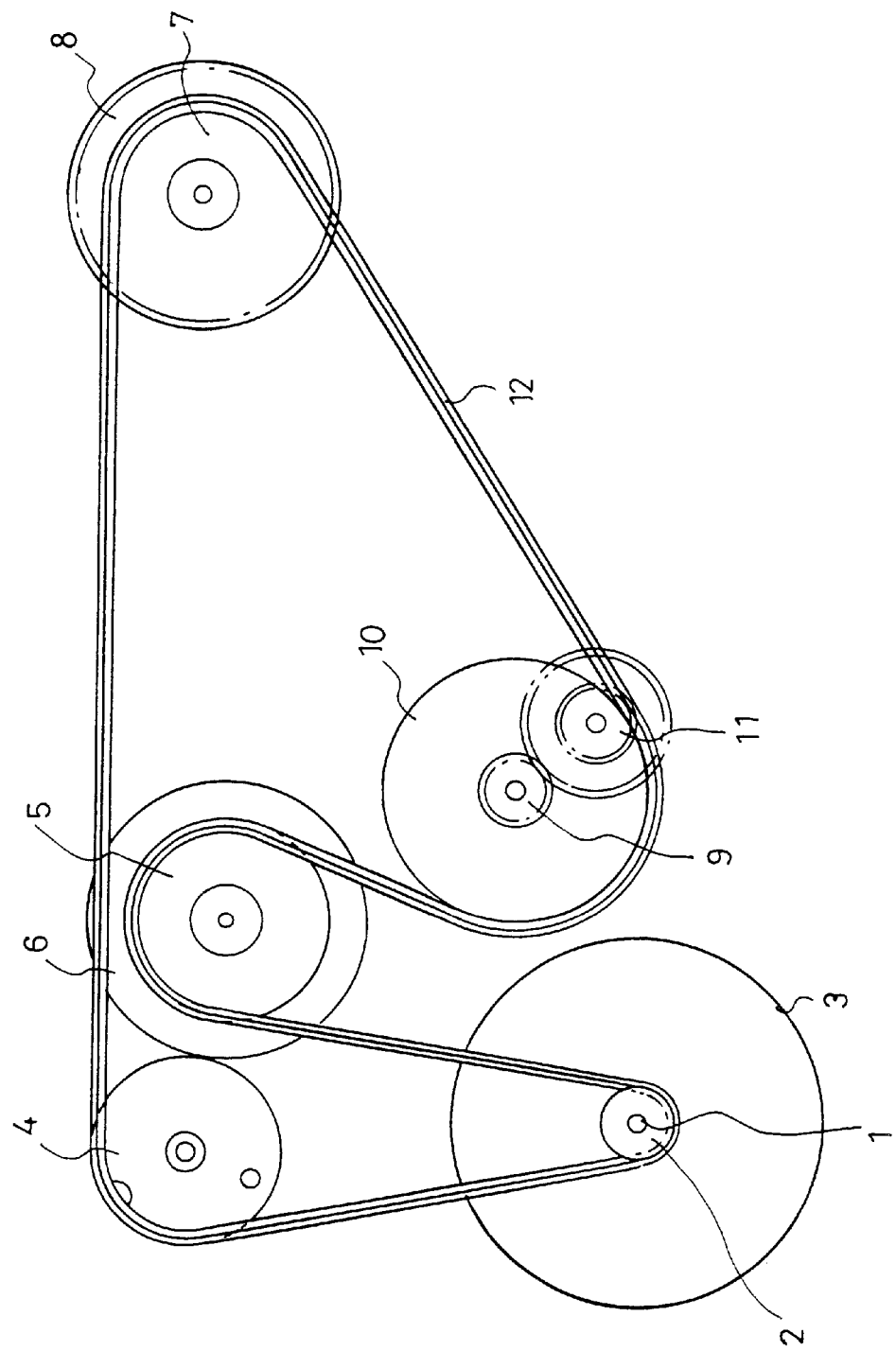
FIG. 1 is a schematic view showing a deck mechanism of a headphone stereo according to the conventional art.
Figure 2:
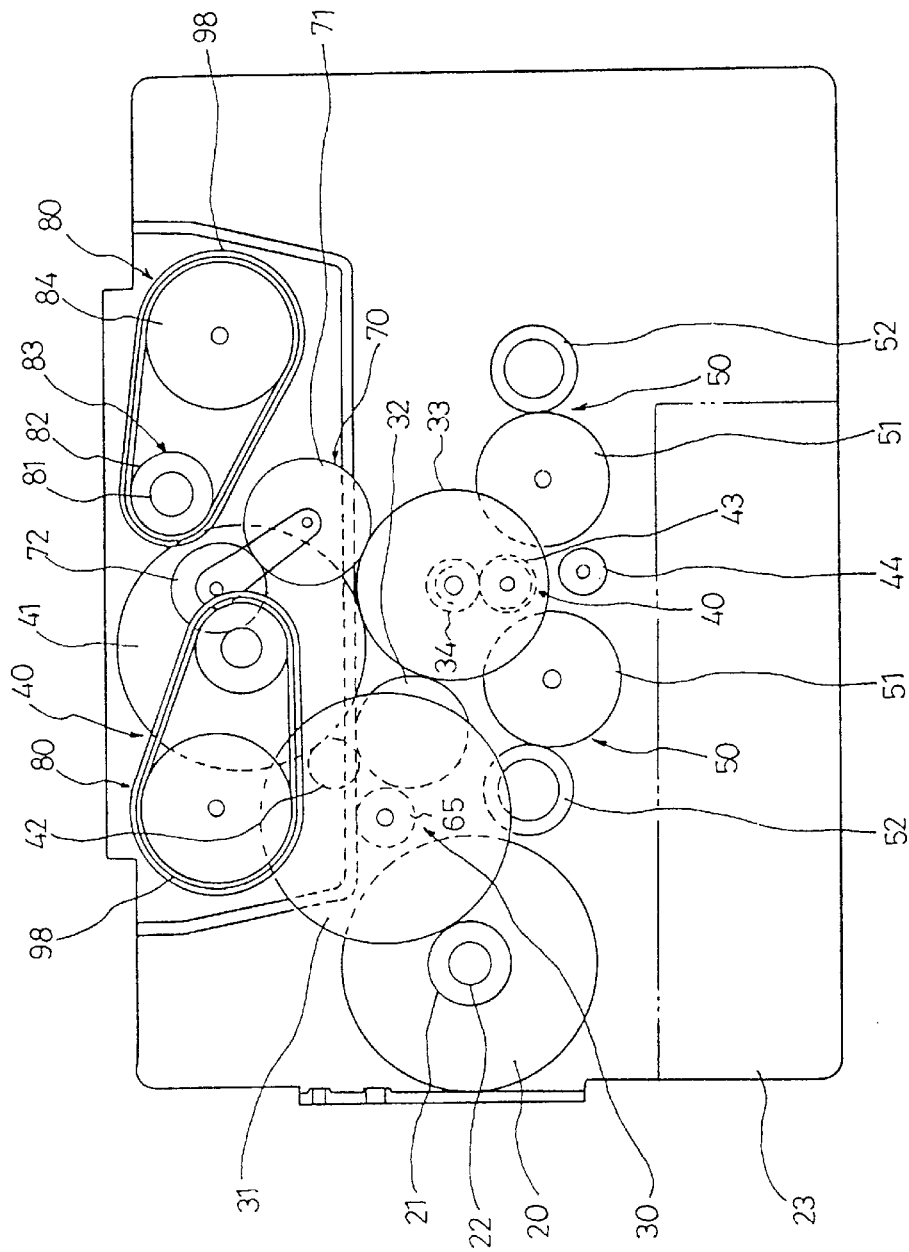
FIG. 2 is a view showing a deck mechanism of a headphone stereo according to an embodiment of the present invention.

FIG. 2 is a view showing a deck mechanism of a headphone stereo according to an embodiment of the present invention. As shown, a driving motor 20 for generating a driving force is disposed at one side of a main base 23, and an axial gear 21 is disposed on a rotating axis 22 of the driving motor 20.

At one side of the driving motor 20 is disposed a power transmission gear unit 30 including a plurality of gears for transmitting a rotating force of the axial gear 21. At one side of the axial gear 21 is mounted a main gear 31 which engages and cooperates with the axial gear 21, and at one side of the main gear 31 is disposed a mid gear 32 which cooperates with the main gear 31.

At a predetermined side of the mid gear 32, a clutch gear 33 is provided to engage and cooperate with the mid gear 32. At a lower portion of the clutch gear 33 is disposed a friction gear 34 which is rotated by friction with the clutch gear 33.

Since transmission of a driving force between the main gear 31 and the mid gear 32 are related to torque controller 60, the elements comprising the torque controller 60 will now be described in detail.

On a predetermined portion of the main base 23, a mode selector 40 is provided for utilizing a driving force transmitted by the power transmission gear unit 30 according to each mode. At an upper portion of the clutch gear 33, a cam gear 41 is mounted which can be driven by a solenoid valve (not illustrated) when a user selects a mode. At one side of the cam gear 41 a gear mode 42 is provided selectively engaging with the cam gear 41 in order to operate an operation plate (not illustrated).

In a play mode, a play gear 43, which can be selectively operated by the operation plate (not illustrated) operated by the mode gear 42, engages with one side of the friction gear 34. At one side of the clutch gear 33 a high-speed running gear 44 is disposed which can be selectively operated by the operation plate (not illustrated) operated by the mode gear 42 in an FF or REW mode.

Reel drivers 50 for operating reels 53 are provided at both sides of the play gear 43 of the mode selector 40 and the high-speed running gear 44, and transmission gears 51 are mounted so that the play gear 43 or the high-speed running gear 44 selectively can engage and cooperate with the transmission gears 51. At one side of the transmission gear 51, reel gears 52 are disposed to engage and operate with the transmission gears 51.

Figure 3:
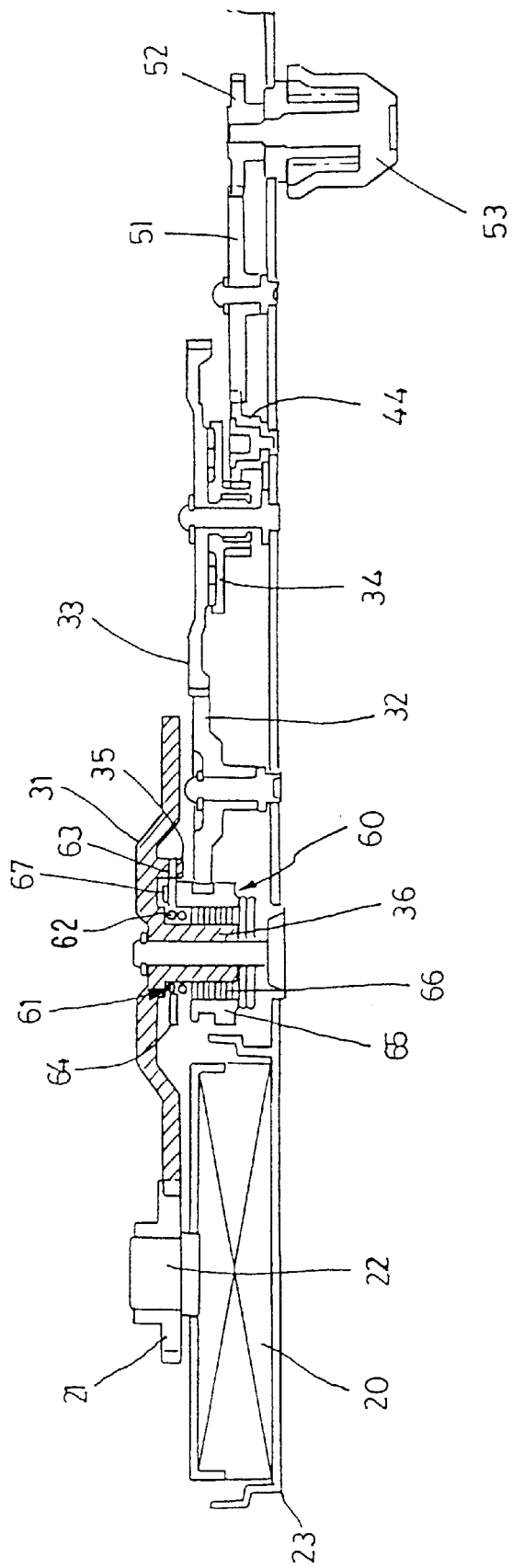
FIG. 3 is a cross-sectional view showing the case in which a torque controller is mounted at a lower portion of a main gear in FIG. 2.
Figure 4:
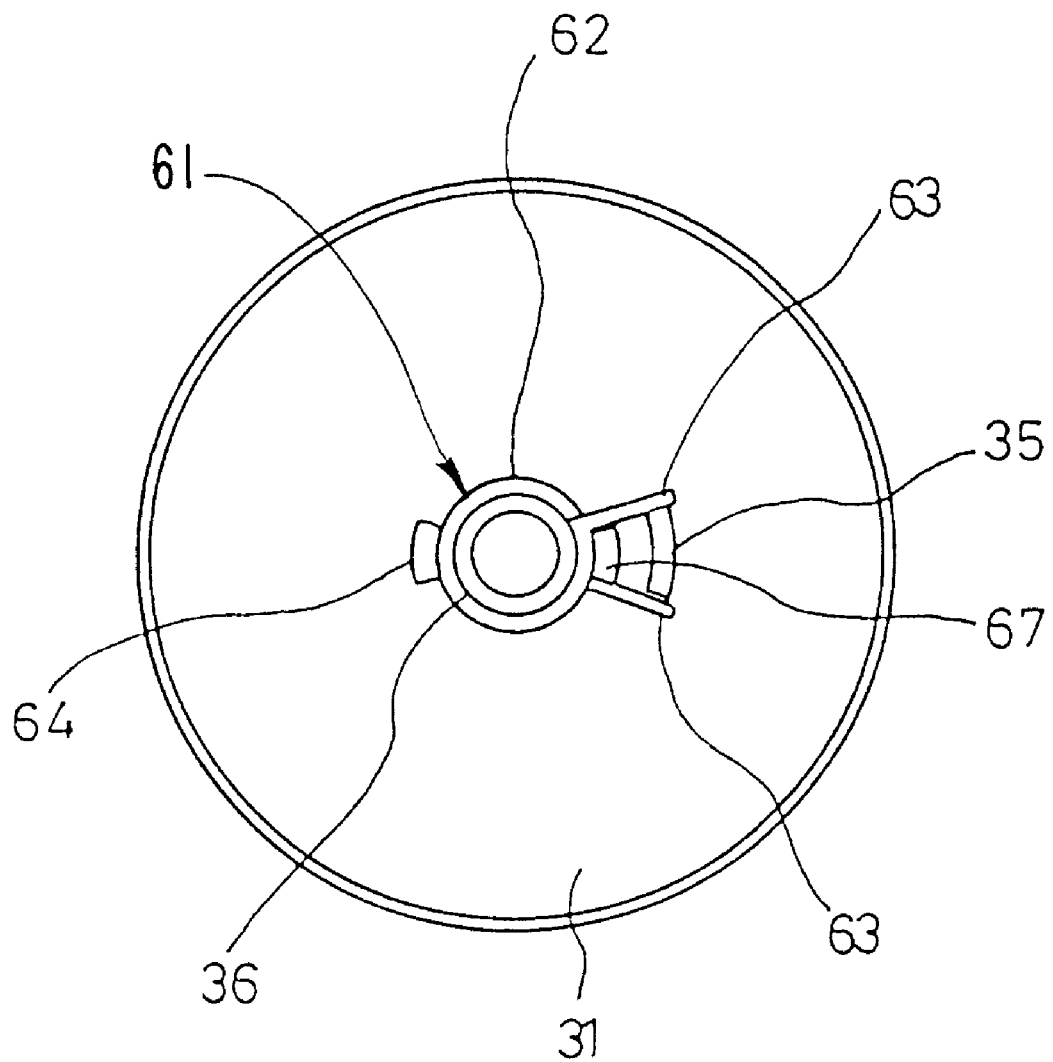
FIG. 4 is a cross-sectional view showing the torque controller in FIG. 3.
Figure 5:
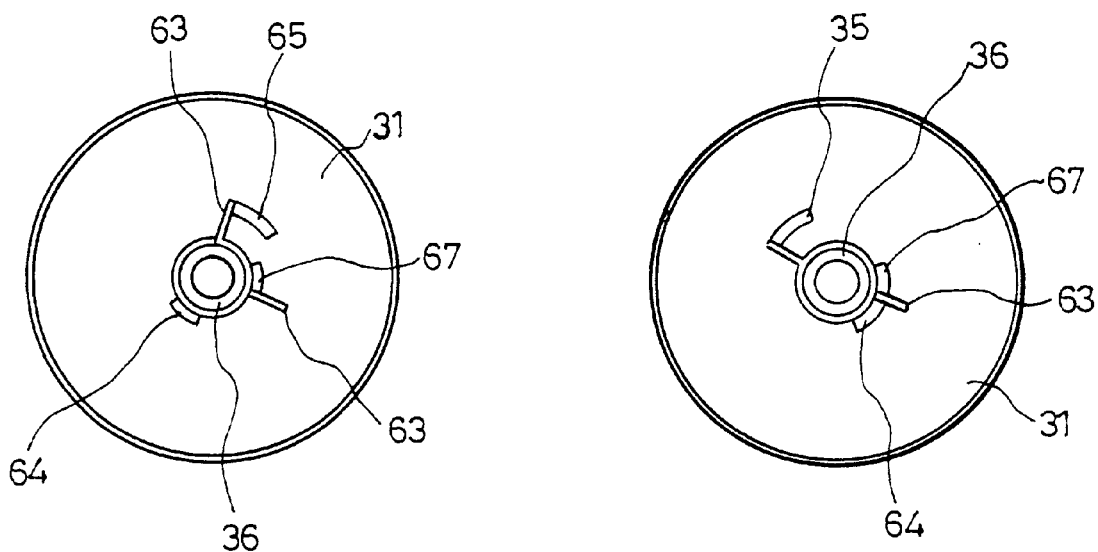
FIG. 5 illustrates an operation of the torque controller in FIG. 3.

In the reel driver 50 or the power transmission gear unit 30, the torque controller 60 can be provided for controlling torque transmitted to the reels 53 in an FF or REW mode. FIG. 3 is a cross-sectional view showing a condition in which torque controller 60 is mounted at a lower portion of the main gear 31 in FIG. 2. FIGS. 4 and 5 are a plan cross-sectional view showing the torque controller of FIG. 3 and an operation of the torque controller of FIG. 3, respectively.

The main gear 31 in which the torque controller 60 is mounted has a lever 35 protruding from a predetermined bottom surface thereof, and a hub 36 protruding from a central bottom surface thereof.

A spiral elastic member 61 surrounds an upper side of the hub 36. The spiral elastic member 61 includes a winding unit 62 corresponding to a body of the spiral elastic member 61, a pair of angularly spaced extended portions 63, and a node 64 formed on the winding unit 62 opposite from the pair of extended portions 63. One of the extended portions 63 extends outwardly from an upper part of the winding unit 62 and the other extended portion 63 extends outwardly from a lower portion of winding unit 62. The node 64 limits rotation of one of the extended portions 63 when that extended portion 63 is rotated about hub 36 of the main gear 31.

At a lower portion of the main gear 31, a torque gear 65 and the mid gear 32 engage with each other, and a cylindrical frictional member 66 is inserted between the torque gear 65 and the hub 36 so that the torque gear 65 is rotated by friction with the hub 36.

At a predetermined upper surface of the torque gear 65, a protrusion unit 67 is positioned at an inner portion at a predetermined angle formed by the extended portions 63.

At an upper portion of the clutch gear 33 of the power transmission gear unit 30, a power transmission idler unit 70 is provided and is operated in the playing direction of the reel drivers 50 in a play mode. At a predetermined upper portion of the clutch gear 33 an idler gear 71 is mounted engaging and operating with the clutch gear 33. At one side of the idler gear 71, a pulley driving gear 72 is engaged with the idler gear 71 so that the pulley driving gear 72 can perform an epicyclic motion around the idler gear 71.

At either side of the power transmission idler unit 70, capstan drivers 80 are provided to selectively operate in the operating direction of the power transmission idler unit 70. At either side of the pulley driving gear 72 are mounted capstan pulley gears 83 having a gear unit 81 and a pulley unit 82 so that they selectively engage and cooperate with the pulley driving gear 72. Capstans 84 are mounted in such a manner that they are operated by a belt 98 winding on the pulley unit 82 of the capstan pulley gears 83 spaced by a predetermined interval from the capstan pulley gears 83.

Figure 6:
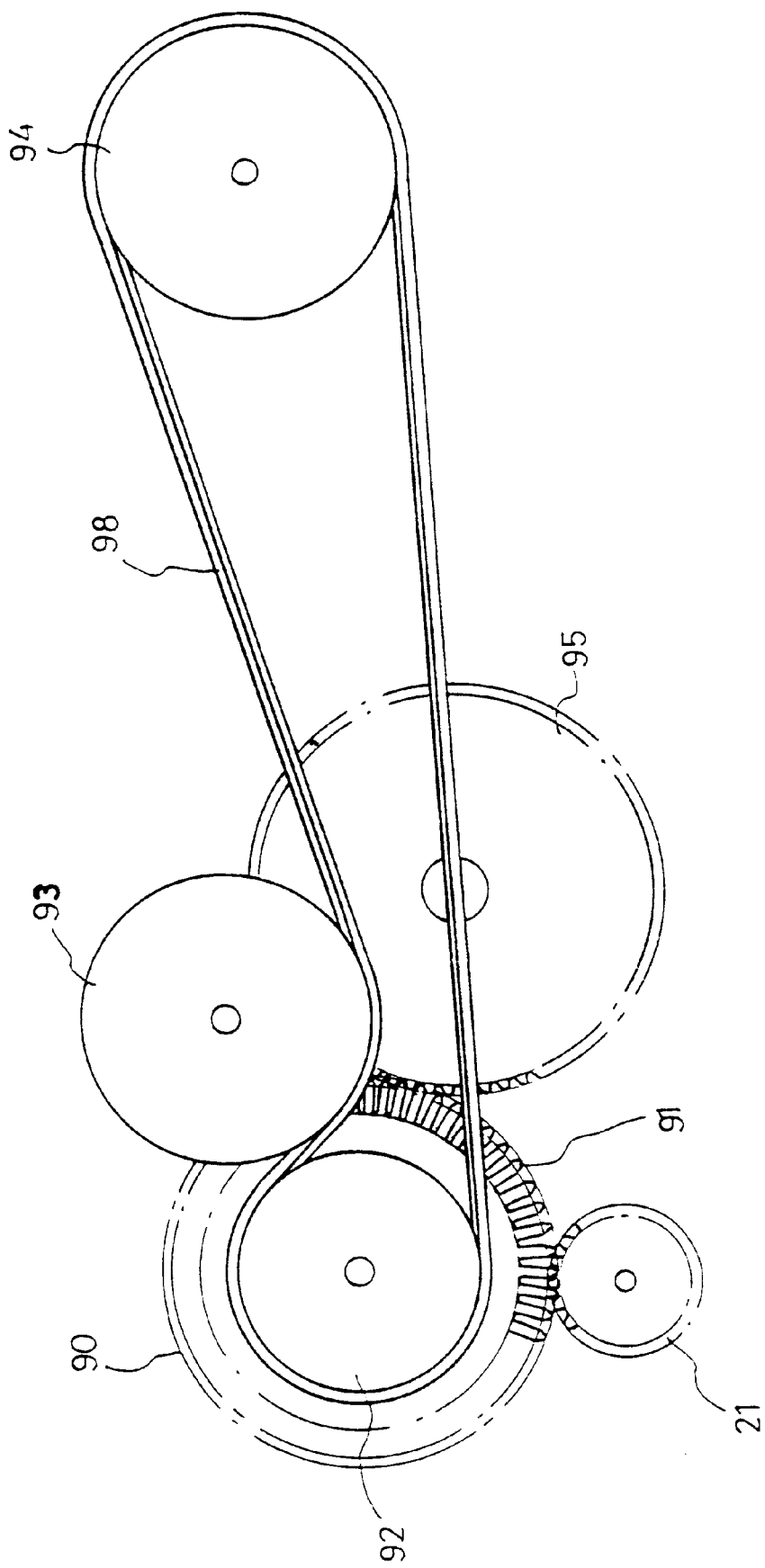
FIG. 6 is a schematic view showing a deck mechanism of a headphone stereo according to another embodiment of the present invention.

FIG. 6 is a schematic view showing a deck mechanism of a headphone stereo according to another embodiment of the present invention. As shown in this drawing, on a mounting position of the main gear 31 in the first embodiment of the present invention, a main pulley gear 90 is disposed to engage and cooperate with the axial gear 21.

The main pulley gear 90 includes a main gear unit 91 engaging the axial gear 21 of the driving motor 20, and a main pulley unit 92 having belt 98 wound therearound.

A RVS capstan 93 is mounted so that a rotating force of the main pulley gear 90 is transmitted to the belt 98, with RVS capstan 93 being spaced by a predetermined interval from the main pulley gear 90. With a predetermined spacing from the RVS capstan 93, an FWD capstan 94 is mounted so that a rotating force of the RVS capstan 93 is transmitted by the belt 98, and a power transmission gear 95 engages main gear unit 91 of the main pulley gear 90 so that the driving force is transmitted in the direction of the reel 53.

The operation and effect of the deck mechanism of the headphone stereo according to the present invention having the above construction will now be described in detail.

The case of selecting an FF or REW mode will be described first.

First, when a mode is selected, the pulley driving gear 72 is maintained in a neutral position between the capstan pulley gears 83, and the high-speed gear 44 engages the clutch gear 33 and the transmission gears 51.

Then, when power is applied and the driving motor 20 is operated, a driving force is transmitted successively to the axial gear 21 of the driving motor 20, the main gear 31, the torque gear 65, the mid gear 32, the clutch gear 33, the high-speed running gear 44, the transmission gears 51, and the reel gears 52 to rotate the reels 53.

Next, when the tape is completely wound by the rotation of the reels 53, a braking force is generated by the tension of the tape, which is successively transmitted to the reel gears 52, the transmission gears 51, the high-speed running gear 44, the clutch gear 33, and the mid gear 32, and as a result, each gear is stopped in order.

Then, when the braking force transmitted to the mid gear 32 is transmitted to the torque gear 65, the braking force transmitted to the torque gear 65 works as a reaction force acting against the rotating force of the main gear 31.

Here, if the rotating force of the main gear 31 exceeds the reaction force of the torque gear 65, the lever 35 of the main gear 31 rotates one of the extended portions unit 63 in the rotating direction, and the node 64 is caught by the outer portion of the one extended portion unit 63 supported by the protrusion unit 67 of the torque gear 65, resulting in racing of the main gear 31.

Then, when power is cut off and the axial gear 21 of the driving motor 20 is stopped, the one extended portion unit 63 returns to its initial condition.

That is, an excessive tension applied to the tape when the reels 53 are stopped is cut off by the torque controller 60.

Next, operation when selecting a play mode will now be explained.

First, when the play mode is selected, the pulley driving gear 72 engages the capstan pulley gears 83 in the play direction, the high-speed running gear 44 deviates from the clutch gear 33, and the play gear 43 engages the transmission gears 51 rotated in a play direction.

Then, when power is applied to drive the driving motor 20, the driving force is transmitted to the axial gear 21 of the driving motor 20, the main gear 31, the torque gear 65, the mid gear 32, the clutch gear 33, the friction gear 34, the play gear 43, the transmission gears 51, and the reel gears 52 to rotate the reels 53.

By rotating the reels 53 in the above-described way, the tape is played at a predetermined speed.

The idler gear 71 is rotated, engaging the clutch gear 33, and the rotating force is successively transmitted to the pulley driving gear 72 and the capstan pulley gears 83. The driving force transmitted to the capstan pulley gears 83 is transmitted to the capstans 84 by the belt 98.

As described above, the rotating force transmitted to the capstans 84 tracks the tape at a certain revolution per minute (RPM) required for the play operation.

Next, as shown in FIG. 6, the operation of another embodiment according to the present invention will now be described.

First, when power is applied to the driving motor 20 and the axial gear 21 is rotated, then the main pulley gear 90 is rotated. The consequently generated rotating force of the main pulley unit 92 is transmitted to the RVS capstan 93 and the FWD capstan 94 through the belt 98, and the rotating force of the main gear unit 91 is transmitted to the power transmission gear 95.

The rotating force transmitted through the above course is used in each mode, and the description of the operation will be omitted since it is identical to the first embodiment.

As described in detail above, according to the present invention, a driving force of the driving motor 20 is transmitted through the extended gear transmission section and the reduced belt transmission section, and therefore power consumption and wow/flutter effects are effectively decreased, enhancing the performance of the product.

Further, by controlling the tension applied to the tape in an FF or REW mode in accordance with the torque controller 60, tape damage is prevented.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a headphone stereo having a reel gear for driving a tape cassette, a capstan for tracking a tape in the tape cassette, and a driving motor rotatingly driving an axial gear of the driving motor, a deck mechanism comprising:

a gear system engaged in a geared relationship with the axial gear for transmitting a driving force of the driving motor;

a mode selector constructed and arranged to control the transmission of the driving force of the gear system in accordance with a selected mode;

a reel driving mechanism engaged with the gear system and constructed and arranged to drive the reel gear using the driving force of the gear system, in accordance with the selected mode;

a capstan driving mechanism constructed and arranged to drive the capstan using the driving force; and a power transmission idler mechanism in a geared relationship with said gear system constructed and arranged to selectively provide the driving force to said capstan driving mechanism to thereby drive the capstan in accordance with a rotational direction of the reel driving mechanism;

wherein one of said gear system and said reel driving mechanism includes a torque controller constructed and arranged to control a torque transmitted to the reel in the selected mode.

2. The mechanism of claim 1, wherein said gear system comprises:

a main gear engaged with the axial gear;

a mid gear engaged with said main gear;

a clutch gear engaged with said mid gear; and a friction gear in frictional contact with said clutch gear so as to be frictionally rotated thereby.

3. The mechanism of claim 2, wherein said mode selector comprises:

a cam gear constructed and arranged to be selectively rotated in a given direction in accordance with the selected mode;

a mode gear selectively engaged with said cam gear in accordance with the selected mode; and a high-speed running gear and a play gear each selectively engaged with said clutch gear and said friction gear, respectively, in accordance with said selective engagement of said mode gear.

4. The mechanism of claim 3, wherein the reel driving mechanism comprises:

a transmission gear selectively engaged with and driven by one of said play gear and said high-speed running gear, depending on the selected mode, said transmission gear being engaged with the reel gear so as to drive the reel.

5. The mechanism of claim 2, wherein said power transmission idler mechanism comprises:

an idler gear engaged with said clutch gear; and a pulley driving gear engaged with said idler gear, said pulley gear being arranged so that said pulley driving gear moves in an epicyclic motion around said idler gear.

6. The mechanism of claim 5, said capstan driving mechanism comprises:

a capstan pulley gear, comprising a gear unit and a pulley unit, provided so that said capstan pulley gear is engaged with said pulley driving gear;

the capstan being connected to said capstan pulley gear by a belt engaging said pulley unit of said capstan pulley gear and the capstan, thereby driving the capstan.

7. The mechanism of claim 1, wherein said torque controller comprises:

a main gear having a lever protruding from a bottom surface thereof and a hub protruding from a central portion of said bottom surface;

an elastic member including:

a winding unit, a pair of extended portions, one of said extended portions extending outwardly from an upper portion of said winding unit, and the other of said extended portions extending outwardly from a lower portion of said winding unit, said pair of extended portions being angularly spaced from each other at an angle, and a node formed on said winding unit opposite said pair of extended portions and being arranged to limit rotation of one of said extended portions when said one extended portion is rotated about said hub; and a torque gear mounted on said hub distal to said elastic member with a friction member interposed between said torque gear and said hub, said torque gear having a protrusion unit protruding from an upper surface thereof, said protrusion unit being arranged to be disposed at an inner portion at said angle formed by said pair of extended portions.

* * * * *

UNITED STATES PATENT AND TRADEMARK OFFICE
CERTIFICATE OF CORRECTION

PATENT NO. : 5,964,425
DATED : October 12, 1999
INVENTOR(S) : Hong Jae JIN; Byung Ju DAN It is certified that error appears in the above-identified patent and that said Letters Patent is hereby corrected as shown below:

On the title page, item [56] References Cited, U.S. Patent Documents, insert the following:

--December 13, 1995    Korea    49219/1995
December 13, 1995    Korea    62068/1995
September 10, 1996    Korea    28729/1996--

Signed and Sealed this

First Day of August, 2000

*Attest:*

Q. TODD DICKINSON

*Attesting Officer*      *Director of Patents and Trademarks*